United States Patent [19]

Graber

[11] Patent Number: 5,657,791

[45] Date of Patent: Aug. 19, 1997

[54] CONTROL CARTRIDGE FOR A SINGLE-LEVER MIXER FITTING

[75] Inventor: Heinz Graber, Oberkulm, Switzerland

[73] Assignee: KWC AG, Uterkulm, Switzerland

[21] Appl. No.: 541,499

[22] Filed: Oct. 10, 1995

Related U.S. Application Data

[63] Continuation of Ser. No. 212,844, Mar. 15, 1994, abandoned.

[30] Foreign Application Priority Data

Mar. 16, 1993 [CH] Switzerland ............... 00786/96

[51] Int. Cl.$^6$ .................................................. F16K 11/074
[52] U.S. Cl. ...................... 137/625.41; 137/801; 251/340
[58] Field of Search ......................... 137/625.4, 625.41, 137/801; 251/340

[56] References Cited

U.S. PATENT DOCUMENTS

| | | | |
|---|---|---|---|
| 4,262,699 | 4/1981 | Fabian | 137/625.41 X |
| 4,423,752 | 1/1984 | Psarouthabis | 137/625.41 |
| 4,610,268 | 9/1986 | Knapp | 137/454.6 |
| 4,765,002 | 8/1988 | Platner. | |

FOREIGN PATENT DOCUMENTS

| | | |
|---|---|---|
| 29156 | 4/1970 | Australia. |
| 2 506 886 | 12/1982 | France. |
| 2 525 319 | 10/1983 | France. |
| 30 15 178 A1 | 10/1982 | Germany. |
| 2 073 373 | 10/1981 | United Kingdom. |

*Primary Examiner*—John Fox
*Attorney, Agent, or Firm*—Oliff & Berridge

[57] ABSTRACT

In a plumbing assembly, a control cartridge for a single-lever mixer fitting is small enough to be installed into the mouth region of a discharge arm. The shut-off elements include a first control disk, which is fixed to the fitting housing and a second control disk, which can be rotated by an actuating lever. The control disks preferably consist of ceramic and have, in each case, two through-passages, one each for cold and hot water. Upon rotation of the fitting, first the cold-water through-passage and then hot-water through-passage are released, and, subsequently, the cold-water through-passage is throttled. With exclusively one rotary movement of the lever, the following flow conditions result: cold-mixed-hot. The resulting water through-flow remains at least approximately constant after achieving the maximum cold-water through-flow.

19 Claims, 2 Drawing Sheets

CONTROL CARTRIDGE FOR A SINGLE-LEVER MIXER FITTING

This is a continuation of application Ser. No. 08/212,844 filed Mar. 15, 1994, now abandoned.

BACKGROUND OF THE INVENTION

1. Field of the Invention

The invention relates to a control cartridge for a single-lever mixer fitting in a plumbing assembly. More particularly, the invention relates to a mixer fitting in which the quantity of water flowing therethrough and the mixing temperature between cold and hot water can be set on the single actuating lever.

2. Discussion of Relates Art

Known mixer fittings are generally installed where water lines emerge either from a wall or from a washbasin. Upon actuation of the fitting with wet hands, water usually ends up dripping onto the rear shoulder or border of the wash-basin, drying there and leaving behind limescale deposits, possibly mixed with soap and dirt. Such soiling can be avoided, for example, with a sanitary discharge fitting according to German Patent Publication 30 15 178, which is arranged in the mouth region of a discharge arm. This known discharge fitting is equipped with a coaxially arranged handle but is, however, not suitable for mixing cold and hot water.

Other mixer fittings of known construction are usually too large for installation in the mouth region of a discharge arm.

SUMMARY OF THE INVENTION

An object of the invention is thus to provide a control cartridge for a single-lever mixer fitting that is compact and takes up little space. This mixer fitting is preferably small enough to be installed in the mouth region of a discharge arm.

This and other objects are accomplished by a control cartridge for a single-lever mixer fitting according to this invention that includes a housing with connections for the supply of cold and hot water and two abutting coaxial control disks. The first control disk is fixed to the housing and the second control disk can be rotated by an actuating element. The first control disk exclusively two through-passages, the first of which is connected to the cold-water connection and the second of which is connected to the hot-water connection. The second control disk has at least one through-passage connected to an outlet. The inlet through-passages of the first control disk and the through-passage of the second control disk are arranged in such a manner that they are distributed at least approximately on a common circle line. Thus, upon rotation of the second control disk in the opening direction, first the cold-water supply is released up to the maximum extent, and then, in addition, the hot-water supply is released. Subsequently, the cold-water supply is throttled.

A control cartridge according to this invention can be designed to be particularly small because its movable control disk exclusively provides rotary movement for opening and closing the fitting and also for setting the mixing ratio. In contrast, control disks of generally known control cartridges also provide radial displacement movement relative to the other control disk.

A further reduction in size of the device is made possible because cold and hot water flow through the two control disks of the control cartridge according to the invention in only one direction. Thus, only the through-passages for cold and hot water are necessary in each control disk. In contrast, control disks of known control cartridges usually deflect the water stream, with the result that more than two through-passages are necessary in at least one of the control disks. As is known, the conventional control disk requires a greater diameter.

BRIEF DESCRIPTION OF THE DRAWINGS

Preferred embodiments of the invention are illustrated in more detail with reference to the drawings, in which.

DETAILED DESCRIPTION OF PREFERRED EMBODIMENTS

Figure 1:
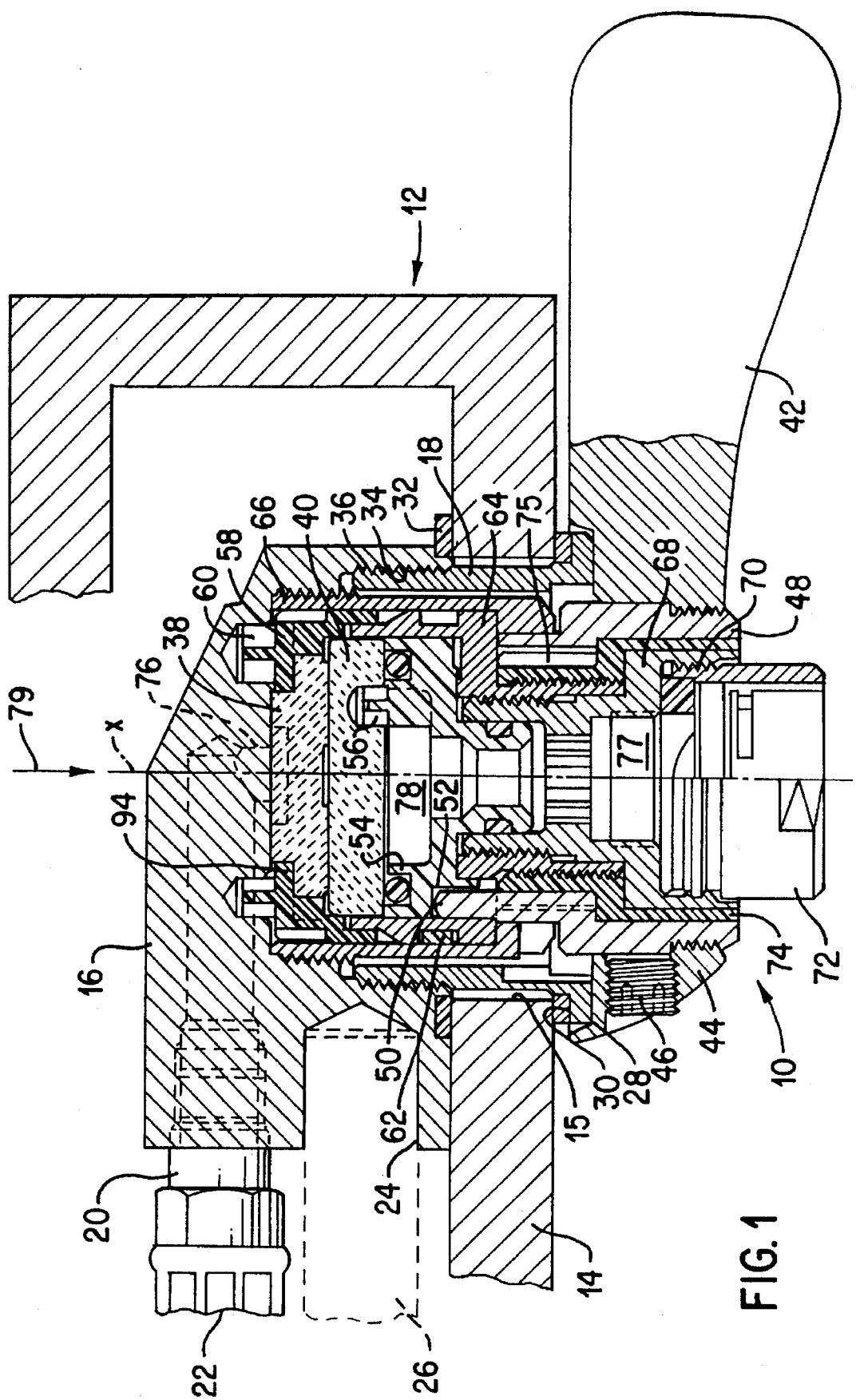
FIG. 1 is a side view in partial longitudinal section of a control cartridge of a single-lever mixer fitting installed in a discharge arm.

FIG. 1 shows a control cartridge 10 installed in an opening 15 in the mouth region 12 of a discharge arm 14. A fitting housing 16, into which a fastening nut 18 is screwed, is introduced within discharge arm 14 and is equipped with two connection stubs 20, only one of which is shown. Connection stubs 20 are located one beside the other for hot and cold water. In FIG. 1, the rear connection stub is concealed by the front connection stub 20. Supply-line hoses or pipes 22 are connected to each connection stub 20, which are guided within the discharge arm 14. A peg 26, shown in phantom, is temporarily pushed into a radially arranged bore 24 in fitting housing 16 and serves as a mounting aid when installing the control cartridge 10.

The fastening nut 18 has an outwardly extending flange 28, by which it is supported against discharge arm 14, via an intermediate ring 30 on the outer side of discharge arm 14. On the inner side of discharge arm 14, an intermediate ring 32 is interposed between fitting housing 16 and the inner side of discharge arm 14. Discharge arm 14 can consist either of metal or, as a constituent part of a washbasin (not shown), of ceramic material. Fastening nut 18 is screwed by a coaxial external thread 34 into an internal thread 36 of fitting housing 16.

As shut-off and through-flow-quantity adjusting elements for cold and hot water, a top, first ceramic control disk 38, which is fixed to fitting housing 16, and a bottom, rotatable, second ceramic control disk 40 are provided. The disks 38 are designated hereinbelow as first control disk 38 and second control disk 40. Each control disk 38 and 40 are positioned around a fixed central axis, which coincides with central axis X of control cartridge 10. Second control disk 40 can be rotated by a manually pivotal actuating lever 42 through an angle of approximately 100°. Both control disks 38 and 40 have through-passages as described below.

Actuating lever 42 has a screw collar ring 44 that is fixed on a first driver bush 48 by a hexagon-socket adjusting screw 46. First driver bush 48 has an outwardly extending driver pin 50 in the axial direction and engages a cutout 52 of a second driver bush 54. Second driver bush 54 has a driver pin 56 that engages second control disk 40. These bush connections produce a rotational connection from actuating lever 42 to second control disk 40.

A cartridge head 58 bears on first control disk 38 in a rotationally fixed manner and has an anti-rotation pin 60 anchored in fitting housing 16. A cartridge housing 64 is connected to cartridge head 58 and is fastened in fitting housing 16 by a cartridge fastening nut 66. A further anti-rotation element 62 is positioned between cartridge housing 64 and cartridge fastening nut 66. Cartridge housing 64 is rotationally fixed to a retaining part 68, which has an internal thread 70 for attaching a mouthpiece, for example, a jet regulator 72. An intermediate element 74 serves as a bearing bush for first driver bush 48 and limit stop 75 delimits the angle of rotation of lever 42 to restrict the temperature of the water flowing into the fitting.

The inflow of the cold and hot water through fitting housing 16 in the direction of first control disk 38 occurs via two axially directed through-flow bores 76, which as viewed in FIG. 1 are located one behind the other. In a mixing chamber 78 beneath second control disk 40, cold and hot water are mixed together depending on the position of actuating lever 42. Apart from turbulence, the flow does not change direction in its pass from the through-flow bores 76 to an outlet 77, with the result that the flow essentially maintains a single through-flow direction 79.

Figure 2:
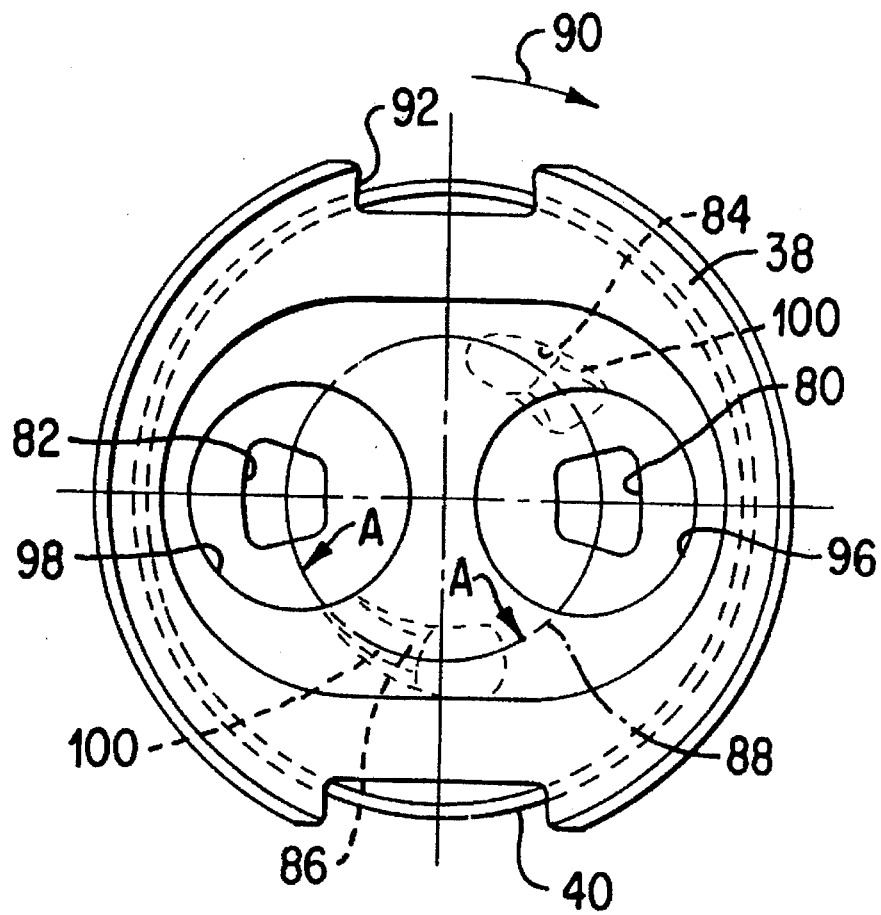
FIG. 2 is a plan view of two control disks of the control cartridge.

FIG. 2 shows the two directly adjacent control disks 38 and 40 in a plan view in the closed position. First control disk 38, which is fixed to fitting housing 16, has two inlet through-passages, including a cold-water through-passage 80 and a hot-water through-passage 82. On its top side, first control disk 38 has depressions 96 and 98 that surround through-passages 80 and 82. Second control disk 40, located beneath first control disk 38, has a cold-water through-passage 84 and a hot-water through-passage 86. Through-passages 80, 82, 84, and 86 of the two control disks 38 and 40 are radially distributed and aligned at least approximately on a circle 88. Thus, upon rotation of second control disk 40 in the opening direction 90, the cold-water supply is first released up to the maximum extent, and then, in addition, the hot-water supply is released. Subsequently, the cold-water supply is throttled to zero.

To prevent rotation, first control disk 38 has, on its circumference, two cutouts 92 that engage with protrusions 94 (FIG. 1) on cartridge head 58.

Through-passages 80 and 82 in first control disk 38 are located diametrically opposite to each other. In contrast, through-passages 84 and 86 in second control disk 40 are offset to achieve the above-mentioned function wherein cold-water through-passage 84 opens before hot-water through-passage 86. Furthermore, through-passages 84 and 86 in second control disk 40 are profiled in the circumferential direction. Upon rotation in the opening direction 90, cold-water through-passage 84 exhibits a decreasing through-passage cross-section, and hot-water through-passage 86 exhibits an increasing through-passage cross-section in relation to through-passages 80 and 82 of first control disk 38.

Figure 2A:
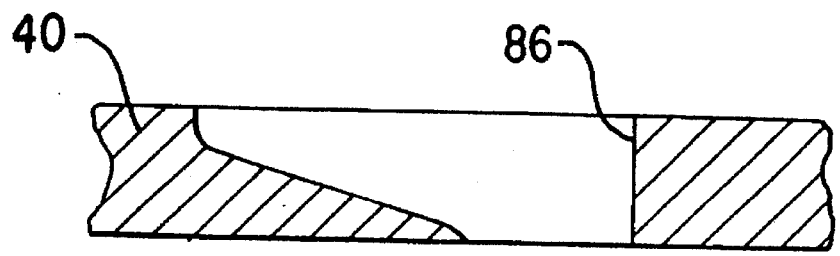
FIG. 2a is a cross-sectional view along line A—A in FIG. 2.

To achieve continuous throttling, at as seen in FIG. 2(A), least one through-passage 80 or 82 and 84 or 86 in at least one control disk 38 or 40 can be profiled in the axial direction. (see dotted line 100 in FIG. 2) this in addition to or without profiling in the circumferential direction.

If the temperature of the hot water supplied is too high for use, the angle of rotation of second control disk 40 can be delimited by a circumference-side offsetting or adjustment of intermediate element 74. To achieve this, intermediate element 74, which exhibits a stop for delimiting rotation, can be repositioned by being drawn out of a toothing system and re-introduced in a rotationally offset manner after releasing corresponding parts.

As can be appreciated from the above illustrations, second control disk 40 can be rotated exclusively about the central axis X. In contrast to conventional fittings, control disk 40 cannot be displaced radially.

Instead of the above-described two through-passages 84 and 86 of second control disk 40, it is also possible to arrange only one through-passage in disk 40 to satisfy the required conditions such that, upon rotation in the opening direction 90, first all of the cold-water supply and then the hot-water supply are released and, subsequently, the cold-water supply is throttled. In such a case, however, the through-flow openings in first control disk 38 would have to be offset with respect to each other by an angle smaller than 180°.

Ceramic material has proved to be the best material for control disks 38 and 40. However, other suitable materials may also be used.

While advantageous embodiments have been chosen to illustrate the invention, it will be understood by those skilled in the art that various changes and modifications can be made therein without departing from the scope of the invention as defined in the appended claims.

What is claimed is:

1. A control cartridge for a single-lever mixer fitting comprising:
    a housing including a cold-water connection and a hot-water connection;
    an outlet that defines a point where at least one of cold-water and hot-water is expelled from the housing;
    a first control disk with a central axis, said first control disk being fixedly coupled to said housing and having a first fixed through-passage coupled to said cold water connection and a second fixed through-passage coupled to said hot water connection, wherein said first fixed through-passage and said second fixed through-passage are substantially equally radially spaced from said central axis;
    a second control disk rotatably arranged in said housing and abutting said first control disk, wherein said first control disk and said second control disk are aligned along said central axis, said second control disk having at least one movable through-passage communicating with said outlet, wherein said at least one movable through-passage of said second control disk and said first and second fixed through-passages of said first control disk are substantially equally radially spaced from said central axis; and
    an actuating element coupled to said second control disk that rotates said second control disk between an open position and a closed position,
    wherein during rotation of said second control disk into the open position, said first and second fixed through-passages of said first control disk and said at least one movable through-passage of said second control disk are selectively aligned, such that cold water is first released to a maximum extent, then hot-water is released, and, subsequently, cold water is throttled, further wherein water flows through said first and second fixed through-passages of said first control disk and said at least one movable through-passage of second control disk to said outlet in an essentially rectilinear and straight flow direction substantially without deflection.

2. The control cartridge of claim 1, wherein said at least one movable through-passage of said second control disk comprises a first movable through-passage and a second movable through-passage, said first movable through-passage corresponding to said first fixed through-passage for cold water of said first control disk and said second movable through-passage corresponding to said second fixed through-passage for hot water of said first control disk.

3. The control cartridge of claim 2, wherein said two movable through-passages of said second control disk have a tapered profile in a circumferential direction with respect to said central axis such that, upon rotation into the open position, said first movable through-passage has a decreasing cross-section and said second movable through-passage has an increasing cross-section.

4. The control cartridge of claim 1, wherein said two fixed through-passages in said first control disk are positioned diametrically opposite each other.

5. The control cartridge of claim 1, wherein at least one of said fixed and movable through-passages in at least one of said first and second control disks is profiled in the axial direction for continuous throttling.

6. The control cartridge of claim 1, wherein a maximum angle of rotation of said second control disk is at least approximately 100°.

7. The control cartridge of claim 6, further comprising a delimiter coupled to said actuator that limits rotation of said second control disk to a set angle smaller than the maximum angle of rotation to limit water temperature.

8. The control cartridge of claim 1, wherein said housing comprises a fastening nut adapted to be coupled into an opening in a discharge arm and a fitting housing rotatably coupled to said fastening nut adapted to be coupled within a cavity of the discharge arm.

9. The control cartridge of claim 8, wherein said fitting housing has connection stubs for a cold-water supply line and a hot-water supply line that form said cold-water connection and said hot-water connection respectively.

10. The control cartridge of claim 1, further comprising a driver bush rotatably coupled in said housing that is rotatable around said central axis and defines said outlet, wherein said actuating element is fixed to said driver bush.

11. The control cartridge of claim 1, wherein said control disks consist of a ceramic material.

12. The control cartridge of claim 10, wherein the at least one movable through-passage of said second control disk opens into a mixing chamber arranged in said driver bush and connected to the outlet.

13. A mixer fitting comprising:

a discharge arm having a mouth region with an opening therein;

an outlet; and a control cartridge countersunk in said opening of said mouth region of said discharge arm, said control cartridge comprising:

a housing having a cold-water supply connection and a hot-water supply connection, said housing including a fitting housing located within said mouth region and a fastening nut located in said opening in said discharge arm rotatably coupled to said fitting housing with said mouth region clamped between said fitting housing and said fastening nut;

an actuator rotatably coupled to said housing and extending outwardly from said discharge arm;

an outlet member coupled to said housing that is in selective fluid communication with said cold-water supply connection and said hot-water supply connection;

a single first control disk fixedly coupled to said fitting housing having a cold-water through-passage and a hot-water through-passage; and a second control disk coupled to said actuator for rotational movement with respect to said first control disk, said second control disk being axially and radially fixed with respect to said first control disk, said second control disk having at least one through-passage therein positioned for selective alignment with said cold-water through-passage and said hot-water through-passage in said first control disk, further wherein water flows through said cold-water through-passage and said hot-water through-passage of said first control disk and said at least one through-passage of said second control disk to said outlet in an essentially rectilinear flow direction without substantial deflection.

14. The mixer fitting of claim 13, wherein said through-passages in said first control disk are positioned diametrically opposite each other.

15. The mixer fitting of claim 13, wherein said at least one through-passage of said second control disk comprises first and second through-passages radially aligned in a circumferential direction.

16. The mixer fitting of claim 15, wherein said first and second through-passages of said second control disk have opposing tapered profiles in a circumferential direction such that said first through-passage has a decreasing cross-section and said second through-passage has an increasing cross-section in the circumferential direction.

17. The mixer fitting of claim 13, wherein at least one of said through-passages in at least one of said first and second control disks is profiled in an axial direction for continuous throttling.

18. The mixer fitting of claim 13, further comprising a delimiter coupled to said actuator that limits rotation of said second control disk to control water temperature, and wherein a maximum angle of rotation of said second control disk is at least approximately 100°.

19. The mixer fitting of claim 13, wherein said control disks consist of a ceramic material.

* * * * *

UNITED STATES PATENT AND TRADEMARK OFFICE
CERTIFICATE OF CORRECTION

PATENT NO. : 5,657,791
DATED : August 19, 1997
INVENTOR(S) : Heinz GRABER

It is certified that error appears in the above-indentified patent and that said Letters Patent is hereby corrected as shown below:

On the title page, in item [73], change "Uterkulm" to --Unterkulm--.

Signed and Sealed this

Fourth Day of November, 1997

Attest:

BRUCE LEHMAN

*Attesting Officer*      *Commissioner of Patents and Trademarks*